Jan. 12, 1960
A. L. BARRETT
2,920,747
EXTENSIBLE BELT CONVEYOR
Filed April 27, 1954
3 Sheets-Sheet 1
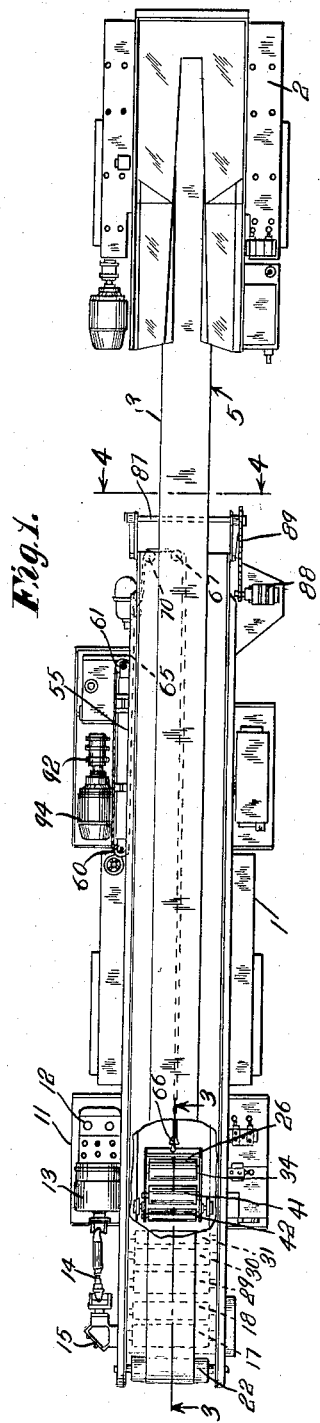
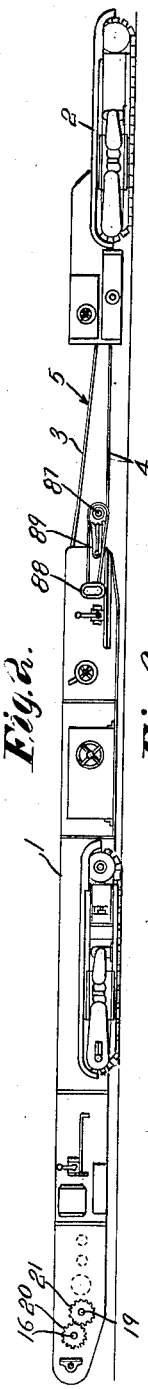
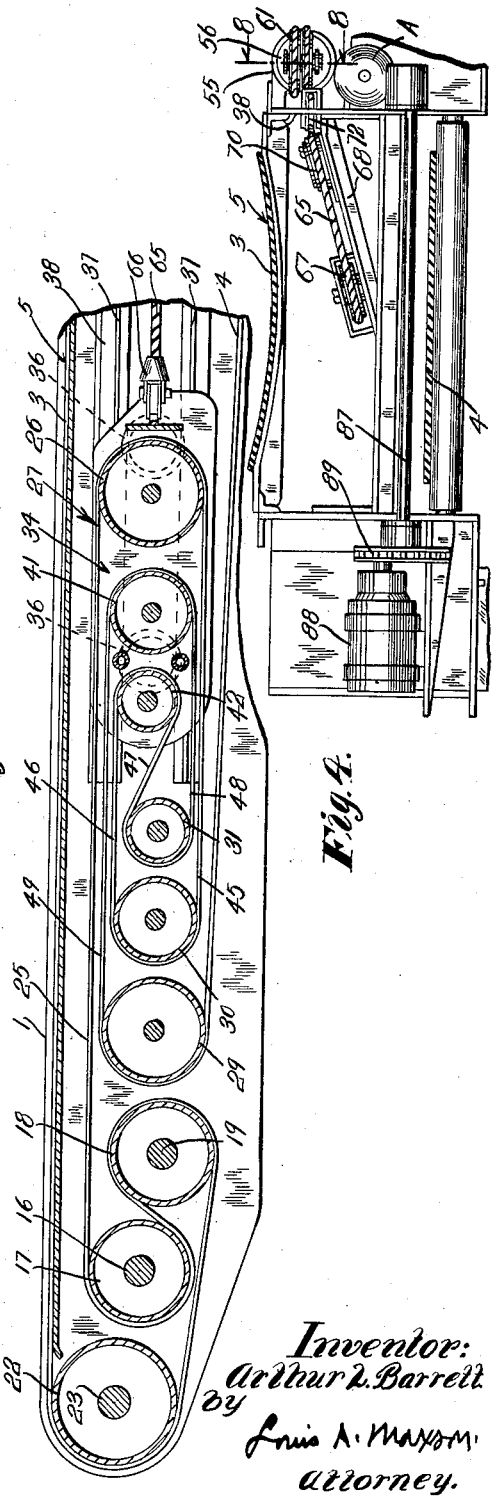
Inventor:
Arthur L. Barrett
by
Louis A. Maxson
Attorney.

Jan. 12, 1960
A. L. BARRETT
2,920,747
EXTENSIBLE BELT CONVEYOR
Filed April 27, 1954
3 Sheets-Sheet 2
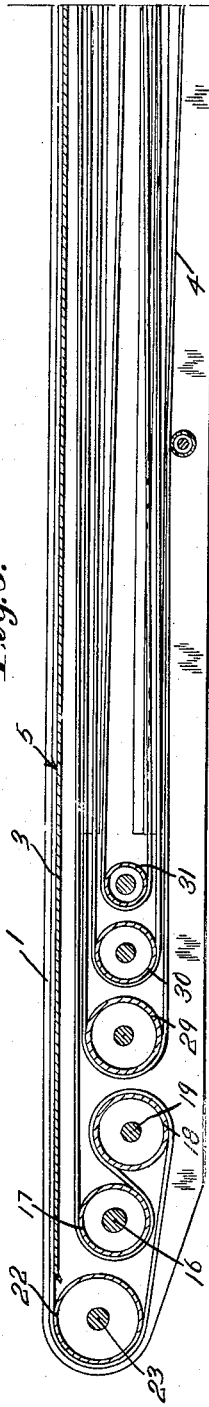
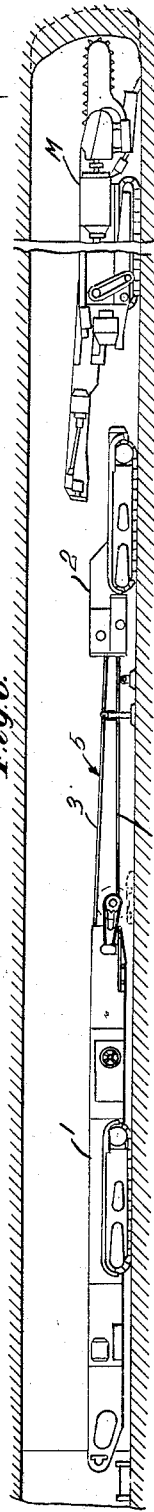
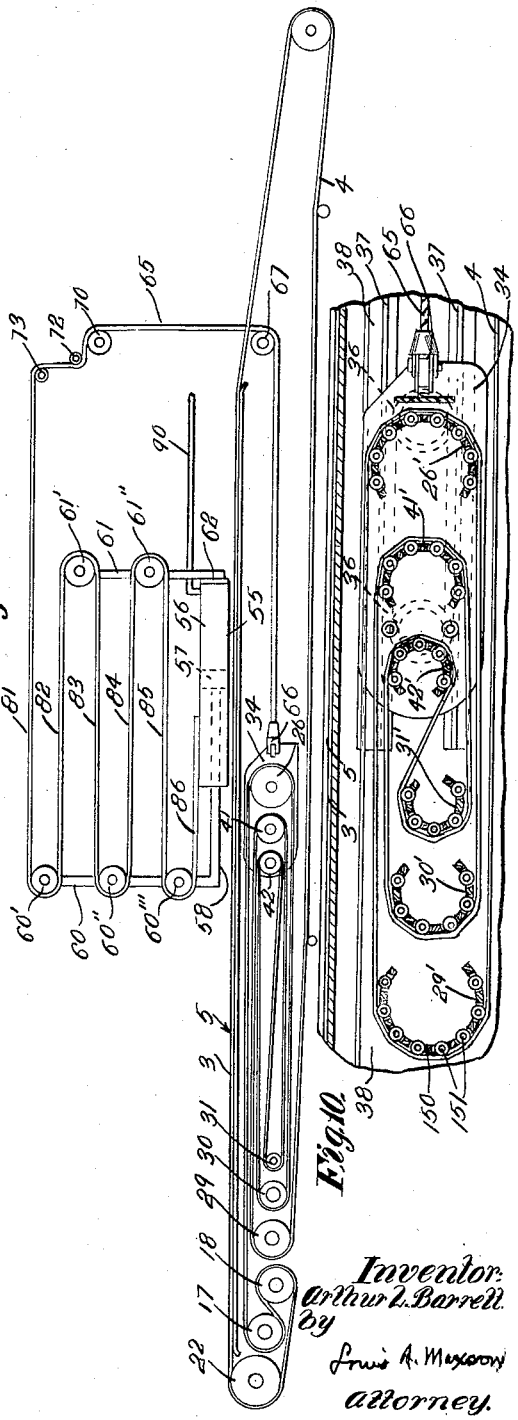
Inventor.
Arthur L. Barrett
by
Louis A. Maxson
Attorney.

Jan. 12, 1960
A. L. BARRETT
2,920,747
EXTENSIBLE BELT CONVEYOR
Filed April 27, 1954
3 Sheets-Sheet 3
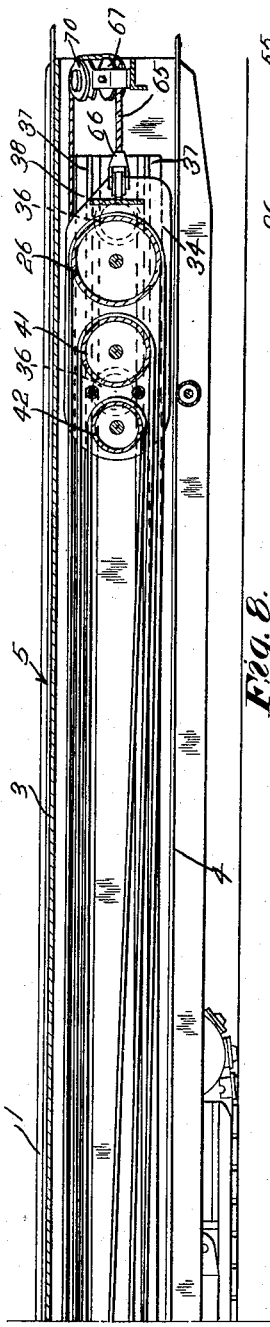
Inventor:
Arthur L. Barrett
by
Louis A. Maxam
Attorney.

United States Patent Office 2,920,747
Patented Jan. 12, 1960

2,920,747

EXTENSIBLE BELT CONVEYOR

Arthur L. Barrett, Franklin, Pa., assignor to Joy Manufacturing Company, Pittsburgh, Pa., a corporation of Pennsylvania Application April 27, 1954, Serial No. 425,890

15 Claims. (Cl. 198—139)

My invention relates to extensible belt conveyor devices, and particularly to improvements in the belt storing and paying out arrangements carried by the drive buggy of a portable extensible belt conveyor system of the kind described and claimed in the application of George Baechli, Serial No. 225,791, filed May 11, 1951, now abandoned.

Apparatus of the kind described in said Baechli application includes two self-propelled vehicles; a larger, rearward one called a drive buggy and a smaller forward one called a take-up buggy. The forward end of a continuous run of conveyor belt extends around a forward idler roll on the take-up buggy, and the forward portion of the upper belt run is arranged to receive material, for example from such a device as a continuous miner. The upper, active run of conveyor belt extends back from the take-up buggy to the drive buggy, and is suitably guided and supported on the latter, and at the extreme rear end of the drive buggy illustrated in the Baechli application there is arranged a reversing idler roll over which the top run of the belt passes and discharges material, and forward of this reversing idler there is a drive roll arrangement to and around which the return run of the conveyor belt extends. The top run of the belt is adapted to discharge at the rear end of the drive buggy onto any suitable conveyor system. The return run of the belt passes, after leaving the drive roll arrangement, over an arrangement for storing and paying out inversely varying portions of the continuous belt, which arrangement comprises a plurality of devices—as illustrated in the Baechli application, rolls—about which there occur reversals of belt direction between belt portions leading respectively rearward to them and forwardly from them and a plurality of other devices—rolls in the Baechli application—about which there occur reversals of belt direction between belt portions leading respectively forwardly to them and rearwardly from them. Certain of said devices are mounted upon a suitably guided and supported movable carriage and a number of others are mounted on the drive buggy in relatively fixed positions thereon nearer the rearward end of the latter and the belt passes back and forth between the devices on the carriage and the other devices until, finally, a run thereof passes forward over the remainder of the length of the drive buggy and to the lower belt run on the take-up buggy. Means is provided for automatically controlling the position of the movable-carriage-supported set of devices about which belt reversals take place, permitting these devices to approach the set of such devices which occupy relatively fixed positions on the drive buggy as the take-up buggy moves away from the drive buggy and for automatically moving the carriage-supported devices away from the others as the take-up buggy moves back toward the drive buggy.

The apparatus of the Baechli application is well adapted to use in the mining of seams of substantial height, but because the movable roll cluster therein shown and the associated rolls turning on stationary axes are disposed with their axes in several different vertically spaced substantially horizontal planes the apparatus is not well suited to operation in very low mineral seams, and the overall height of the apparatus is greater than that which the present invention makes possible, and low height, when it does not introduce undesirable complications, is much to be sought for in underground mining apparatus.

It is an object of the present invention to provide an improved belt storing and extension arrangement. It is another object of the invention to provide an improved arrangement for storing and paying off inversely verying portions of a continuous conveyor belt comprising a plurality of devices about which there occur reversals of belt direction between belt portions leading respectively rearwardly to them and forwardly from them, and a plurality of other devices about which there occur reversals of belt direction between belt portions leading respectively forwardly to them and rearwardly from them, and in which there is provision for relative movement of approach and separation between said pluralities of devices. It is a further object of the invention to provide an improved belt storing and extension arrangement particularly adapted for use on drive buggies of apparatus of the character above briefly described. Other objects and advantages of the invention will hereinafter appear.

In the accompanying drawings:

Fig. 1 is a plan view, with parts broken away, of a drive and take-up buggy mechanism of the character described, in which the illustrative embodiment of the invention is incorporated.

Fig. 2 is a side elevational view of the structure shown in Fig. 1.

Fig. 3 is an enlarged vertical central section through the rear portion of a drive buggy incorporating the illustrative embodiment of the invention, the section being taken on the plane of the line 3—3 of Fig. 1.

Fig. 4 is an enlarged vertical transverse section, on the plane of the line 4—4 of Fig. 1, showing the end of the drive buggy which is nearer the take-up buggy.

Fig. 5 and Fig. 5a, taken together, provide an enlarged central longitudinal section through the drive buggy, the parts being shown with the maximum amount of belt stored on the drive buggy.

Fig. 6 is a diagrammatic view illustrating the portable extensible belt conveyor apparatus in which the invention is incorporated, in use in a mine in association with a continuous miner.

Fig. 7 is a diagrammatic view of the belt storing and extension arrangement.

Fig. 8 is an enlarged longitudinal section on the line 8—8 of Fig. 4 showing details of the belt storing and paying out apparatus.

Fig. 9 is a diagrammatic view showing the hydraulic system associated with the belt storing and paying out apparatus.

Fig. 10 is a fragmentary central longitudinal sectional view showing a modification.

It will be appreciated that in view of the improvement character of the present invention, it will be unnecessary to describe a great many of the details of the structure in which the improvement has been made, and reference may be had to the application of Baechli mentioned above for such details.

Referring now to the drawings, and first to Figs. 1, 2 and 6, it will be noted that a drive buggy 1 and a take-up buggy 2 are connected by the active, 3, and return, 4, runs of a conveyor belt generally designated 5, and that the take-up buggy is adapted to follow closely behind a continuous miner M as indicated in Fig. 6 and receive material discharged by the latter. It is unnecessary in this application to describe any of the details of construction of the drive buggy and reference for desired information with respect to this structure may be had by referring to the Baechli application above mentioned, which includes a feature of a tilting frame which is not disclosed in the present application. It may be said in passing that both the drive buggy 1 and the take-up buggy 2 are self-propelled.

Only the conveyor belt driving and control means of the drive buggy 1 will need particular description herein. It may be noted that upon a platform 11 mounted at one side of the rear end of the drive buggy 1 there is a motor 12 which, through suitable reduction gearing, not shown, but housed in a casing 13, and connectible through an extensible universal drive connection 14 and further gearing 15, is adapted to drive a shaft 16, on which a belt driving roll 17 is mounted. A secondary driving roll 18 is associated wtih the drive roll 17. The roll 18 has a supporting and driving shaft 19, and the shafts 16 and 19 are gear connected as indicated in Fig. 2 by spur gears 20 and 21 meshing with each other and respectively mounted on the shafts 16 and 19. The top run of the belt 3, after passing along the top of the drive buggy, passes around a reversing roll 22 supported by a shaft 23 near the rearward end of the drive buggy, and the belt 5 passes forwardly from the lower side of the roll 22, up around the forward side of the secondary drive roll 18, rearwardly and downwardly beneath the drive roll 17 and then upward again over the drive roller 17 and then forward in a run 25 to the first element 26 of a belt storing and paying out system generally designated 27, from the final roll 29 of which the return run 4 of the belt 5 passes forwardly and ultimately to the take-up buggy 2.

The improved belt storing and paying out system 27 includes a series of rolls rotating on stationary axes and a series of belt guiding and direction reversing devices, shown, except in Fig. 10, as rolls, called a "cluster" for convenience, mounted on a moving carriage and means for controlling—and for also effecting—movement of the carriage and cluster relative to the rolls which turn on stationary axes. One of the stationary rolls, 29, has already been mentioned. There are two others, 30 and 31, and these are mounted, as shown, on the drive buggy for rotation on axes lying in a plane parallel to the path of active run 3 of the belt along the top of the drive buggy. Roll 31 is of smaller diameter than roll 30, which is disposed between roll 31 and roll 29, and roll 30 is of smaller diameter than roll 29. The movable carriage is designated 34, and as more fully described and shown in the Baechli application above mentioned is provided with wheels 36, 36 guided by and rolling along guide rails 37, on a frame section 38 of the drive buggy 1.

The carriage 34 carries three devices—shown in Figs. 1, 3 and 5a as guide rolls—about which reversals of belt direction are adapted to take place. These guide rolls rotate on axes fixed with respect to the carriage 34, but, as the carriage moves longitudinally of the frame section 38 of the drive buggy the carriage-supported rolls approach or move away from the rolls 29, 30 and 31. The rolls on the carriage include the roll 26 previously mentioned, and two others respectively numbered 41 and 42. The roll 41 is between the rolls 26 and 42. The diameters of rolls 26 and 29 are as shown the same, the diameters of rolls 30 and 41 are as shown the same, and the diameters of the rolls 31 and 42 are as shown the same. The axis of rotation of the rolls 29, 30 and 31 are in a common plane, which is as shown parallel to the active run 3 of the belt as the latter passes along the top of the frame section 38. The axes of rotation of the rolls 26, 41 and 42 are in a common plane, which is shown as parallel to the active run 3 of the belt as the latter passes along the top of the frame section 38. The plane in which the axes of rotation of the rolls 26, 41 and 42 lie is slightly above the parallel plane in which the axes of the rolls 29, 30 and 31 lie.

In addition to the active and return runs of the belt 5, there are six strands or reaches of belt which have their lengths altered as there occurs relative movement of the carriage 34 along the guide rails 37. One of these strands is the belt section previously identified as 25, which extends from the drive roll 17 to the roll 26. The others are identified as follows:

45 extending between rolls 26 and 30,
46 extending between rolls 30 and 42,
47 extending between rolls 42 and 31,
48 extending between rolls 31 and 41, and
49 extending between rolls 41 and 29.

When the carriage 34 moves from the position shown in Fig. 3 toward the right in that figure, i.e. towards the position shown in Fig. 5a, substantially six times as much belt length as the distance of carriage movement must be drawn into the belt storing and paying out system, and, as such length may be supplied equally by the active and return runs 3 and 4 respectively of the belt, the take-up buggy starting from a position at least as far from the drive buggy as three times the length of travel of the carriage 34 would have to move three times such distance towards the drive buggy 1 for the carriage to make the movement mentioned. On the other hand, the take-up buggy can move away from the drive buggy three times as far as the carriage 34 moves, if the carriage moves from a position from the position shown in Fig. 5a to the position shown in Fig. 3.

The carriage 34 may be caused to move to the left upon the drive buggy 1 by motion of the take-up buggy 2 away from the drive buggy but return of the take-up buggy toward the drive buggy will not effect the winding in of the slack thereby produced.

An appropriate arrangement for winding in such slack, for permitting the introduction of additional belting into the system, and for maintaining necessary tension in the belt system is illustrated in Figs. 7, 8 and 9. It will be noted that in Fig. 8 the parts, being shown from the left-hand side of the apparatus, looking forward, appear oppositely from their showings in Figs. 7 and 9. A hydraulic cylinder and piston mechanism 55 is mounted at one side, herein the left-hand side looking forwardly of the frame section 38, being secured to such frame section near its top and forwardly of its longitudinal center.

This cylinder and piston mechanism 55 is single acting and includes a cylinder 56, a piston 57, a piston rod 58 (see Figs. 7 and 9).

A multiple (triple) block 60 diagrammatically shown in Fig. 7 and carried on the piston rod 58, and a multiple (double) block 61 mounted on the head 62 of the cylinder 56, are visible in Fig. 8. The cylinder and piston mechanism 55 has a cable section 65 associated with it. One end of this cable is attached, at what may be called its free end, to the forward end of the carriage 34, as at 66. From connection 66 the cable section 65 extends forwardly and around a pulley 67 journaled on an oblique element 68 carried by the frame 38 and located at the forward end of the latter (see Fig. 4). From the pulley 67 the cable section passes laterally to another pulley 70 rotatably supported for turning on an axis parallel to that of the pulley 67 and close to the left-hand side of the frame 38 looking forward. Next the cable section passes rearwardly about pulleys 72 and 73 which, so to speak, set it over laterally of the frame 38 to a position outside of the latter. From the pulley 73 the cable section 65 is passed into cooperative relation with the mechanism 55 and finally has its remaining end fixed with respect to the cylinder 56 where it is connected as at 75. The multiple block 60 has its three sheaves individually identified by the reference characters 60', 60'' and 60'''. The sheaves of the multiple block 61 are individually identified by the reference characters 61' and 61''. The run of the cable passing rearwardly from the pulley 73 may be identified as 81. It passes rearwardly and around the pulley 60' and then continues as a forwardly extending run 82 to and around the pulley 61'. From the pulley 61' a run 83 extends rearwardly to and around the sheave 60". After passing around the sheave 60" the cable has a run 84 extending forward to the sheave 61" and then there is a rearwardly extending run 85 passing to the sheave 60''', and from the latter a terminal portion 86 extends forwardly and is secured in fixed relation to the cylinder 56 at 75.

As in the Baechli case above mentioned, a shaft 87 is provided to receive a reel and may be driven by a motor 88 through a chain and sprocket drive 89. For further details reference may be had to the Baechli case.

Fig. 9 shows a combined hydraulic and electric system which may be used for controlling the operation of the mechanism so far described herein. The cylinder 56 is shown and this, with its piston 57, will be referred to for convenience as the take-up jack.

Fluid is adapted to be supplied to and released from the take-up jack through a conduit 90. This has connected in communication with it an accumulator A, to provide a reservoir of fluid under pressure. A tank 91 for a hydraulic fluid is provided. A pump 92 has its intake connected by a conduit 93 with the tank. An electric driving motor 94 is provided for the pump, the control circuit for which motor will shortly be described. Motor 94 and pump 92 are supported on the drive buggy on the left-hand side of the forward end thereof as shown in Fig. 1. Pump 92 has a discharge line 95 in which there is a check valve 96 which permits fluid to flow past it from the conduit 95, but which prevents reverse flow. Check valve 96 is connected by a conduit 97 with the supply box section 98 of a valve box structure 99 which, though in practice it may contain additional control valves, is shown, since that is all that is necessary for this case, with but a single control box section 100. A discharge valve section 103 is also included in the valve box structure 99. The discharge section is connected by a conduit 104 with a vent line 105 leading back to the tank. The sections 98, 100 and 103 are of well-known commercial construction. The supply section 98 has an associated relief valve 98' for relieving excess pressure through the sections 100 and 103 to the conduit 104. Section 100 has in it a valve (not shown) which permits free flow of fluid from 97 to a further conduit 106 when the valve is in mid-position. In one shifted position this valve permits supply of fluid to a conduit 90' leading to the conduit 90; in another shifted position it connects conduit 90' to the conduit 104. When the valve in section 100 is in mid-position, pressure fluid is delivered to a conventional control valve box mechanism 107 containing a valve (not shown) which either lets fluid flow freely to a conduit 108 and so to the vent line 105, or enables supply of fluid through a conduit 109 to the reel driving motor 88, whose discharge side is connected by a conduit 110 to the vent line 105.

Conduit 90' has a conduit 112, containing a pressure relief valve 113, leading back to the vent line 105. The relief valve 113 is set at the pressure normally desired in the take-up jack. Still another conduit 115 opens from the conduit 90, and this has a stop valve 116 in it between its connection with conduit 90 and a pressure responsive switch mechanism 118. A pressure gauge 119 is shown at the end of conduit 115. If the pressure in the conduit 90 falls too low the pressure responsive switch mechanism will effect starting of the motor 94.

It will be noted that power lines 121 and 122 are connected, the one, 121, with a conductor 123 containing a motor starting switch 124 and leading to the pump motor 94 and the other, 122, with a connection 125 leading also to the pump motor 94. The switch 124 has an operating solenoid 127 connected by a conductor 128 with the power line 122 and also adapted to have its other end connected with the power line 121. Power line 121 has a selector switch 130 which is adapted to be moved selectively into contact with switch points 131 and 132. Switch point 132 is connected by conductor 133 with the end of the solenoid 127 which is not connected with the conductor 128. The pressure switch 118 has a switch element 135 which is adapted to establish and/or interrupt a circuit between the switch point 131 and the end of the solenoid 127 to which the conductor 133 leads, this through another conductor 136. It will be observed that the switch 135 will be closed only when the pressure in the line 90 is relatively low. It will be further observed that with proper positioning of the switch element 130, the pump motor 94 may be caused to drive the pump continuously. To do this the switch element 130 will contact the switch point 132.

It will be observed that the take-up jack may be manually controlled when the switch element 130 is engaged with the switch point 132, and will be under automatic control when the switch element 130 engages the switch point 131. Manual control of the take-up jack is desired, as will be more fully noted by reference to the Baechli case: (1) when the belt is to be threaded initially into the drive section, (2) when the cluster carriage is to be moved to effect the addition of belt to the system, and (3) when it is necessary to effect tensioning of the belt deliberately. Manual control will be accomplished by employing the selector switch 130 to prevent the pressure responsive switch device 118 from functioning to control the pump motor 94, and by manipulating the valve associated with valve box section 100. Performance of these three operations will extend the take-up jack and draw the cluster away from the stationary belt idlers, and the machine will be filled with belt, or the belt will be tensioned, whichever may be the function which needs to be performed.

To arrange the controls for what may be termed normal operation, that is so that belt is paid out when extension of the conveyor length is needed and so that belt tension will be maintained if the take-up buggy is backed up for any reason, the following operations will be performed: The valve associated with valve box section 100 will be set to maintain a connection between conduit 97 and conduit 90'. The switch 130 will be moved into engagement with switch point 131, and control of the pump motor will be lodged in the pressure responsive device 118. With this setup, tension on the belt will maintain pressure in the take-up jack by trying to collapse it. The pump motor will not be driven if the pressure in the take-up jack is at or above what is normal operating pressure. Driving of the take-up buggy ahead will increase this tension, and the relief valve 113 will then let some oil flow out of the take-up jack and back to the tank. The cluster will thus be allowed to move in a direction to pay out belt. When the normal operating tension is once more restored, the relief valve 113 will close and the existing tension will be maintained until it is necessary to extend the length of the conveyor again.

Now if the take-up buggy is backed, belt tension will drop to a reduced value, and accordingly the pressure in the take-up jack will drop to a value low enough to permit switch element 135 to close a circuit through the solenoid 127, and close the motor control switch 124 and start the pump motor 94, which will operate to restore pressure in the take-up jack, and the cluster will be drawn outwardly until proper tension is reached or until the cluster reaches its outermost position, whichever occurs first. When the restored pressure in the take-up jack reaches the correct operating value, the pressure switch control device 118 will effect stopping of the pump motor, and the conveyor will again be in a position to pay out belt when the take-up buggy moves ahead. It will be appreciated that the device 118 may well be of a character having a rather wide range of pressure difference between the points at which the switch 135 is closed and reopened. Such devices are well-known, and any suitable one may be employed. The device 118 is but diagrammatically illustrated in Fig. 9, it will be understood.

When the winding motor 88 is used to remove belt from the conveyor, the selector switch 130 will be moved to engage the switch point 132, causing the pump 92 to be driven and supply fluid under pressure as long as the switch 130 is in the position mentioned. Other possible operations and details need not be included here, but may be noted and understood by reference to the Baechli case.

In the structure heretofore described it will have been observed that rolls 29, 30, 31, 26, 41 and 42 have been mentioned and described. It is to be understood, however, that the invention is not limited to the employment of rolls in the apparatus for storing and paying out belt. Instead, as illustrated in Fig. 10, there may be substituted for rolls of the requisite diameters arcuate support elements carrying rolls of comparatively small diameter so positioned that essentially semicircular guide arrangements for the belt at places where reversals in direction are required may be available. Referring now to Fig. 10, it will be seen that there are six guide frames numbered, starting from the left-hand side of the view, 29', 30', 31', 42', 41' and 26'. Description of any one of these will make clear the construction of all the rest. Accordingly, it may be noted that the guide frame 29' is of an arcuate extent slightly exceeding 180°. It is provided with slots 150 in which there are supported cylindrical rolls 151 for rotation on axes extending transversely of the drive buggy. These rolls may obviously be journaled in a variety of ways, as will be readily understood by those skilled in the art. The guide frame 29' is mounted on and extends between side plate elements forming a part of the frame 38 and the guide frame 29' may be secured in any desired manner at its opposite ends to these side plates. The projection of the rolls through the outer periphery of the guide frame 29' is sufficient to prevent substantial drag of the belt on the outer periphery of the guide frame 29' as the portions of the belt between adjacent rolls extend tangentially to the peripheries of such rolls. The structure described will clearly perform the essential functions of a rotating roll such as is described with respect to the preferred embodiment. The guide frames 29', 30' and 31' are mounted on the frame section 38. The roll equivalents 42', 41' and 26' are mounted between the side plates of the carriage 34.

More detailed description of this modified construction is unnecessary, but it will be observed that the axes of the arcuate guide frames bear the same relations to each other that the axes of the guide rolls do to each other in the preferred embodiment, and the mode of operation, except that the belt sections extend around and are maintained in contact with the small rolls carried by the arcuate guide frames instead of being maintained in contact with perpiheral portions of rotatable rolls, is the same as in the preferred embodiment.

The reversing roll arrangement on the take-up buggy may be replaced if desired by a construction like that of 26', 41' and 42' of Fig. 10.

It may now be noted that in the belt storing and paying out mechanism the size and disposition of the most remote rollers or arcuate guide arrangements is such that all of the four intermediate rolls or guide devices may lie between planes tangent to the upper and lower sides of the outermost guide rolls or devices. In like manner the closest pair of guide rolls or devices are disposed between planes tangent to the upper and lower surfaces of the intermediate guide rolls or devices. It will further be noted that the vertical distance between parallel horizontal planes respectively tangent to the top of the drive roll 17 and the bottom of the drive roll 18 as shown slightly exceeds the distance apart between a substantially horizontal plane tangent to the top of the roll 26 and a parallel plane tangent to the bottom of the guide roll 29, and the disposition of the drive and guide rolls (and this is likewise true with respect to the guide devices of Fig. 10) is such that an extremely vertically compact arrangement is provided. Note, for example, the vertical distance from a plane tangent to the top of the reversing idler roll 22 to a parallel plane tangent to the bottom of drive roller 18 exceeds the vertical distance between the first plane and a parallel plane tangent to the bottom of the lowest one of the idlers 29, 30, 31, 42, 41 and 26.

While there are in this application specifically described one form and a modification which the invention may assume in practice, it will be understood that this form and modification of the same are shown for purposes of illustration, and that the invention may further be modified and embodied in various other forms without departing from its spirit or the scope of the appended claims.

What is claimed is:

1. In an arrangement for storing and paying out conveyor belt to permit a variation in the distance apart of a belt driving unit and a relatively remote belt direction reversing device, in combination, a frame, a carriage supported for reciprocation lengthwise of said frame, three rolls—a small one, a middle sized one and a large one—rotating on axes fixed with respect to said frame, three other rolls—a small one, a middle sized one and a large one—rotating on axes fixed with respect to said carriage, and a plurality of runs of belt varied in length by movement of said carriage relative to said frame and including a run extending to the large roll on the carriage, a run extending from that roll to the middle sized roll on said frame, a run extending from that roll to the small roll on the carriage, a run extending from that roll to the small roll on the frame, a run extending from that roll to the middle sized roll on the carriage, and a run extending from that roll to the large roll on the frame.

2. In an arrangement for storing and paying out conveyor belt to permit a variation in the distance apart of a belt driving unit and a relatively remote belt direction reversing device, in combination, a frame, a carriage supported for reciprocation lengthwise of said frame, three rolls having their axes in a common plane—a small one, a middle sized one and a large one—rotating on axes fixed with respect to said frame, three other rolls having their axes in a common plane—a small one, a middle sized one and a large one—rotating on axes fixed with respect to said carriage, and a plurality of runs of belt varied in length by movement of said carriage relative to said frame and including a run extending to the large roll on the carriage, a run extending from that roll to the middle sized roll on said frame, a run extending from that roll to the small roll on the carriage, a run extending from that roll to the small roll on the frame, a run extending from that roll to the middle sized roll on the carriage, and a run extending from that roll to the large roll on the frame.

3. In an arrangement for storing and paying out conveyor belt to permit a variation in the distance apart of a belt driving unit and a relatively remote belt direction reversing device, in combination, a frame, a carriage supported for reciprocation lengthwise of said frame, three rolls—a small one, a middle sized one and a large one—rotating on axes fixed with respect to said frame, three other rolls—a small one, a middle sized one and a large one—rotating on axes fixed with respect to said carriage, said small rolls the closest together and said large rolls the most widely separated, and a plurality of runs of belt varied in length by movement of said carriage relative to said frame and including a run extending to the large roll on the carriage, a run extending from that roll to the middle sized roll on said frame, a run extending from that roll to the small roll on the carriage, a run extending from that roll to the small roll on the frame, a run extending from that roll to the middle sized roll on the carriage, and a run extending from that roll to the large roll on the frame.

4. In an arrangement for storing and paying out conveyor belt to permit a variation in the distance apart of a belt driving unit and a relatively remote belt direction reversing device, in combination, a frame, a carriage supported for reciprocation lengthwise of said frame, three rolls—a small one, a middle sized one and a large one—rotating on axes fixed with respect to said frame, three other rolls—a small one, a middle sized one and a large one—rotating on axes fixed with respect to said carriage, and a plurality of runs of belt varied in length by movement of said carriage relative to said frame and including a run extending to the large roll on the carriage, a run extending from that roll to the middle sized roll on said frame, a run extending from that roll to the small roll on the carriage, a run extending from that roll to the small roll on the frame, a run extending from that roll to the middle sized roll on the carriage, and a run extending from that roll to the large roll on the frame, all of said runs except the one between said small rolls substantially parallel and that run oblique to all the others.

5. A storage device for a conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, and said first and second plurality of rollers being of a size and spaced from each other so as to diverge outwardly from a plane extending transversely of said opposite movements between said first and second plurality of rollers.

6. A storage device for a conveyor belt to permit variations in the effective conveying length thereof comprising, a frame having a first plurality of rollers mounted thereon for rotation with respect thereto, a take-up means including a second plurality of rotatable rollers reciprocably movable towards and away from said first plurality of rollers, and said first and second plurality of rollers being of a size and spaced from each other so as to diverge from a plane extending transversely of the directions of said reciprocal movement between said first and second plurality of rollers.

7. A device for storing and paying out conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, said rollers of each of said plurality of rollers being substantially parallel to each other and spaced from each other in a direction in which said movements occur, said first and second plurality of rollers having the most closely adjacent rollers thereof of a smaller diameter than any other rollers of said first and second plurality of rollers, said first and second plurality of rollers having the most remote rollers thereof of a larger diameter than any other rollers of said first and second plurality of rollers, said first and second plurality of rollers having rollers located intermediate said most closely adjacent and said most remote rollers of diameters intermediate said smaller and larger diameters, and said intermediate rollers of each of said plurality of rollers being of a smaller diameter than the roller next adjacent thereto which is more remotely spaced from said smaller diameter rollers.

8. A device for storing and paying out conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, said rollers of each of said plurality of rollers being substantially parallel to each other and spaced from each other in a direction in which said movements occur, said first and second plurality of rollers having the most closely adjacent rollers thereof of a smaller diameter than any other rollers of said first and second plurality of rollers, said first and second plurality of rollers having the most remote rollers thereof of a larger diameter than any other rollers of said first and second plurality of rollers, said first and second plurality of rollers having rollers located intermediate said most closely adjacent and said most remote rollers, said intermediate rollers having a diameter of a size intermediate said smaller and larger diameters, said intermediate rollers of each of said plurality of rollers being of a smaller diameter than the roller next adjacent thereto which is more remotely spaced from said smaller diameter rollers, and said rollers of one of said plurality of rollers having their outer edges tangentially disposed with at least one of the outer edges of the rollers of the other of said plurality of rollers, respectively.

9. A storage device for a conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, said first and second plurality of rollers being of a size and spaced from each other so as to diverge outwardly from a plane extending transversely of said opposite movements between said first and second plurality of rollers, and said rollers of one of said plurality of rollers having their outer edges tangentially disposed with at least one of the outer edges of the rollers of the other of said plurality of rollers, respectively.

10. A storage device for a conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, said first plurality of rollers having their axes located in a common plane, and said second plurality of rollers having their axes located in a common plane parallel to said first mentioned common plane.

11. A storage device for a conveyor belt to permit variations in the effective conveying length thereof comprising, a frame having a first plurality of rollers mounted thereon for rotation with respect thereto, a take-up means including a second plurality of rotatable rollers bodily movable in opposite directions with respect to said first plurality of rollers, said first plurality of rollers having their axes located in a common plane, and said second plurality of rollers having their axes located in a common plane parallel to said first mentioned common plane and spaced therefrom a distance equal to the thickness of conveyor belt which is adapted to be supported by said first and second plurality of rollers.

12. A storage device for a conveyor belt to permit variations in the effective conveying length thereof comprising a frame having a first plurality of rollers mounted thereon for rotation with respect thereto, a take-up means including a second plurality of rotatable rollers bodily movable in opposite directions with respect to said first plurality of rollers, said first and second plurality of rollers being of a size and spaced from each other so as to diverge outwardly from a plane extending transversely of said opposite movements between said first and second plurality of rollers, and each of said rollers of said first and second plurality of rollers having their outer surfaces located to engage two runs of conveyor belting with all but one of said runs being substantially parallel to each other.

13. A storage device for a conveyor belt to permit variations in the effective conveying length thereof comprising a frame having a first plurality of rollers mounted thereon for rotation with respect thereto, a take-up means including a second plurality of rotatable rollers bodily movable in opposite directions with respect to said first plurality of rollers, said first and second plurality of rollers being of a size and spaced from each other so as to diverge outwardly from a plane extending transversely of said opposite movements between said first and second plurality of rollers, each of said rollers of said first and second plurality of rollers having their outer surfaces located to engage two runs of conveyor belting with all but one of said runs being substantially parallel to each other, and the most closely adjacent rollers of said first and second plurality of rollers being located to engage a run of conveyor belting extending obliquely therebetween.

14. A device for a conveyor belt to permit variations in the effective conveying length thereof comprising a frame having a first plurality of rollers mounted thereon for rotation with respect thereto, a take-up means including a second plurality of rotatable rollers bodily movable in opposite directions with respect to said first plurality of rollers, said first and second plurality of rollers being of a size and spaced from each other so as to diverge outwardly from a plane extending transversely of said opposite movements between said first and second plurality of rollers, a belt driving unit spaced from said first plurality of rollers on the side thereof remote from said second plurality of rollers, said first and second plurality of rollers having the most remote rollers thereof of a larger diameter than any other rollers of said first and second plurality of rollers, respectively, said most remote roller of said second plurality of rollers being located to receive a conveyor belt from said driving unit which is spaced to one side of the axes of all other of said rollers, and said most remote roller of said first plurality of rollers being located so that the discharge run therefrom extends along a side of the axes of all other of said rollers opposite said one side.

15. A storage device for a conveyor belt to permit variations in the effective conveying length thereof comprising, a frame having a first plurality of arcuate supports mounted thereon for reversing the direction of such a belt traveling therearound, a take-up means having a second plurality of arcuate supports mounted thereon for reversing the direction of such a belt traveling therearound, said take-up means being movably supported for bodily movement in opposite directions with said second plurality of arcuate supports moving in opposite directions with respect to said first plurality of arcuate supports, said first and second plurality of arcuate supports being of a size and spaced from each other so as to diverge outwardly from a plane extending transversely of said opposite directions between said first and second plurality of rollers, and each of said arcuate supports having rotatable rolls set in their outer peripheries.

References Cited in the file of this patent

UNITED STATES PATENTS

| | | |
|---|---|---|
| 1,453,393 | Jessen | May 1, 1923 |
| 2,452,980 | Beltz | Nov. 2, 1948 |
| 2,623,630 | Erickson | Dec. 30, 1952 |
| 2,678,125 | Bonney | May 11, 1954 |